Patented Mar. 6, 1951

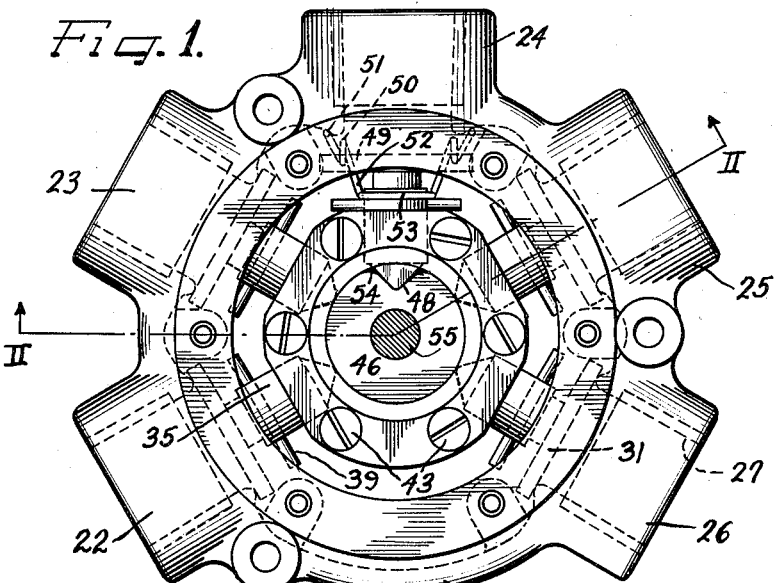

2,544,597

UNITED STATES PATENT OFFICE 2,544,597

FLUID CONTROL VALVE

Ernest Irti, Kenmore, N. Y., and Arthur A. O'Sickey, Cleveland, Ohio

Application October 14, 1944, Serial No. 558,640

6 Claims. (Cl. 277—20)

This invention relates to improvements in a fluid control valve and more particularly to that type of fluid control valve which is adapted to selectively connect a single fluid outlet passage with any one of a plurality of fluid inlet passages.

Valves of this type, which are frequently referred to in the art as selector valves, are widely used for the purpose of selectively connecting a plurality of fuel tanks mounted on an aircraft with the fuel supply system of the engine or engines of such aircraft.

From the standpoint of safety it is highly desirable that such control valves be positive in operation, with an assured flow from the connected tank and a definite shut-off from the tanks not connected.

This desired object is attained in the structure of the present invention wherein the control valve leading from the connected tank opens freely in the direction of fluid flow and wherein the remainder of the control valves are positively held in closed position.

It is also desirable that such selector valves be of such construction that the operative condition thereof may be readily perceptible to the operator, so that the shifting from one tank to another may be easily indexed.

The present invention provides a structure wherein these objects are attained in a superior manner, the successive opening of each control valve being unmistakably perceptible, both audibly and physically.

It is a further important object of the present invention to provide an improved fuel control valve of the poppet type selectively operable by a materially simplified mechanism which requires a minimum of torque in its operation and which embodies the sense of feel by the pilot or operator in changing from one tank to another.

Another object of the present invention is to provide a mechanism of the type referred to in which the fluid control valve opens in the direction of flow of fuel, thereby affording the least amount of disturbance and thus eliminating or materially reducing the presence of vapor lock.

Another object of the invention is to provide a control valve structure embodying sectional valve members which afford relative axial and angular movement between the valve head and stem to insure a fuel-tight seal between the valve head and its seat.

A further object of the present invention is to provide a manually operable cylindrical cam having a single longitudinally extending notch in its peripheral surface in alignment and cooperatively engageable with the stems of the valve members and selectively engageable with one stem at a time, the cam being rotated by the operator to connect one of the fuel tanks with the fuel supply system of the engine.

Another important object of the present invention resides in providing a fuel control valve embodied in a unitary housing of light-weight, compact construction, which is efficient in operation, which facilitates indexing, and which is adaptable to be connected at any desirable location on the plane or other supporting structure.

Other and further important objects of this invention will be apparent from the following description, in which reference will be made to the accompanying drawings.

The invention (in a preferred form) is shown on the drawings and hereinafter more fully described.

On the drawings:

Figure 1 is a top plan view of a fluid control valve embodying the present invention with the cover removed to more clearly illustrate certain structural features.

Figure 2 is a transverse sectional view taken substantially along the line II—II of Figure 1, with parts shown in elevation.

Figure 3 is a fragmentary sectional view taken along the line III—III of Figure 2.

Figure 4 is a fragmentary sectional view of a modified form of the invention wherein the cam-engaging member is made in the form of a roller.

As shown on the drawings:

The accompanying drawings illustrate a form of the invention preferably embodied in a fuel control valve mechanism for use on aircraft, but it should be understood that such mechanism and modifications thereof embodying the present invention may be otherwise adapted by those skilled in the particular art to which this invention pertains.

The fuel control valve of this invention comprises a housing 10 which may be in the form of an aluminum casting for lightness and which is somewhat circular in transverse section, as will be apparent from Figure 1. The housing 10 has a central bore 11 extending inwardly from one end to form an annular wall 12 which terminates in a transverse end wall 12' at the opposite side. The end wall 12' is formed with a circular extension 13 projecting axially inwardly and terminating in a flat transverse face 14 perpendicular to the axis of the housing.

A screw-threaded fuel outlet opening 15 extends inwardly from the end wall 12' into the adjacent extension 13, communicating at its inner end with an axial opening 16 of smaller diameter provided in the outer end of the extension 13. The extension 13 is provided with a plurality of slots 17 extending inwardly from its periphery into communication with the bottom of the outlet opening 15 and spaced apart angularly. These slots permit free flow of fuel from the interior of the housing through the outlet opening 15.

At the open end of the housing 10 an annular flange 18 is formed to removably receive a cover member 19 of aluminum or similar material. A gasket 20 is disposed between the adjacent faces of the flange and cover members to effect a fluid-tight joint, and threaded machine screws 21 extend through aligned openings in the cover member, gasket and flange for securely maintaining the same in assembled relation, the screws being suitably spaced around the periphery of the flange.

The housing 10 is further provided with a plurality of tubular extensions 22, 23, 24, 25 and 26 (see Figure 1) projecting outwardly a suitable distance from the annular wall 12 and spaced apart angularly equal distances except for the extensions 22 and 26, which are spaced apart substantially twice the distance of the others for a purpose to be later described. These tubular extensions are each interiorly screw-threaded at 27 to provide fuel inlet openings adapted for suitable connection with an independent fuel tank. Each fuel inlet opening is adapted to communicate with the fuel outlet opening 15 through substantially identical structures associated therewith and the following description of one of such structures (shown in detail in Figure 2) will be applicable to all.

Referring to Figure 2 it will be noted that the inlet opening, which is threaded at 27, communicates at its inner end with a central opening 28 provided in the adjacent portion of the annular wall 12 and an annular encircling valve seat 29 is formed on the inner peripheral surface of the latter.

A sectional valve member 30, more clearly shown in Figure 3, has a circular valve head 31 of steel or similar material, the outer face of which is formed with an annular recess 32 to receive a flexible seat ring 33 of rubber or similar material and is adapted for cooperative engagement with the valve seat 29 for controlling the flow of fuel therepast. The valve member is provided with a sectional stem including an axial extension 34 projecting inwardly and slidably mounted in the outer end of a tubular extension 35, the inner end of which is closed. The closed end of the tubular extension 35 is provided with an inwardly projecting detent, two sides of which converge in a plane perpendicular to the axis of the valve head, for engagement in a cam notch to be later described. The extension 34 is loosely fitted in the tubular extension 35 to afford limited relative axial movement and also to afford relative angular movement, so that despite any irregularities in the valve seat 29 the valve head will always engage the latter to insure a fluid-tight seal.

It should be noted that the valve opens in the direction of the flow of fluid and suitable means are therefore provided to hold the valve closed despite the static head of fluid. For this purpose a coil spring 37 is disposed axially within the tubular extension 35, having one end engaging the closed end of the latter while its opposite end engages the adjacent end of the extension 34 to normally urge the latter outwardly and effect closing of the valve head against the static head of fluid fuel. The spring 37 should have a resistance approximately three to four times that of the force exerted by the static head of fluid. The extension 34 has an opening 38 extending transversely thereof and of such size that a pin 39 extending therethrough has clearance on either side of such passage. The opposite ends of the pin project through adjacent aligned openings in the tubular extension 35 for a purpose to be later described.

The inner end of the tubular extension 35, as more clearly shown in Figure 2, is slidably mounted in an aligned opening 40 provided in the wall of a hexagonal-shaped member 41 preferably consisting of a phosphor-bronze casting. The member 41 has its inner end resting upon the face 14 of the extension 13 and has an axial projection 42 piloted in the opening 16. A plurality of machine screws 43 project through aligned openings provided in the hexagonal member 41 and the extension 13 for removably securing the same in assembled relation, the screws being suitably spaced angularly as more clearly shown in Figure 1.

Member 41 has a centrally disposed bore 44 extending inwardly from its outer end and communicating at its inner end with a bore 45 of smaller diameter which extends entirely through the projection 42. A cam 46 is rotatably disposed in the bore 44 and has an axial extension 47 rotatably mounted in the bore 45 to afford a suitable bearing for one side of the cam. The free end of the detent 36 is continuously engaged by the outer peripheral wall of the cylindrical cam 46 to maintain the valve member in closed position. This cylindrical wall has a single longitudinally extending V-shaped cam notch 48 of complementary shape with respect to the detent 36 into which it is adapted to engage upon rotation of the cam to permit movement of the valve member in alignment with said notch into open position.

Suitable means are provided to assist in the opening movement of the valve members and preferably comprise specially formed springs 49 having relatively spaced coil portions at their lower ends and free ends 51 engageable with the adjacent housing walls (Figure 1). The intermediate portions of these springs include continuous upwardly projecting arms 52 on the opposite side from the free end thereof, with a connecting loop 53 encircling the adjacent end of the tubular extension 37 and adapted for engagement with the projecting end of the pin 39 in such a manner that a resilient force is applied to the pin in the direction of the opening movement of the valve member. It should be further noted that the engagement of this encircling loop 53 of the spring prevents rotation of the tubular extension 35, and since that extension is maintained in non-rotative engagement with the remainder of the valve structure by the pin 39, the valve assembly is thereby retained in predetermined angular position.

The peaks of the notch 48 may be rounded as at 54 to cooperate more freely with movements of the detents 36 so as to reduce to a minimum the torque required to rotate the cam.

The cam 46 has an operating shaft 55 formed integrally therewith and projecting axially outwardly from the side opposite the extension 42, the shaft being rotatably disposed in an opening provided in the cover member 19. A bearing member 56, of phosphor bronze or other suitable material, is disposed in the outer portion of the bore 44 and has a laterally extending marginal flange 57 adapted to rest upon the outer adjacent face of the hexagonal member 41. Said bearing member 56 has a central opening through which the adjacent portion of the shaft rotatably extends.

The cover member 19 is formed with a tubular depending extension 58 encircling the shaft in spaced relation and a packing gland member 59 is slidably disposed in the open end of the extension. A compressible packing ring 60 encircles the adjacent portion of the shaft and is disposed between the bottom of the tubular extension and the inner side of the gland member. A coil spring 61 encircles the adjacent portion of the shaft and has one end engageable with the gland member and the other end engageable with the bearing member to exert a separating force sufficient to afford the shaft seal.

In the modified form of this invention illustrated in Figure 4 the converging detent member 36 which engages in the cam notch is supplanted by a roller 36' rotatably mounted between forks provided at the inner end of the tubular extension 35' which is otherwise constructed exactly as is the tubular extension 35 hereinbefore described.

From an examination of Figure 1 it will be apparent that the detent members 36 on all of the valve structures are disposed relatively so that they may be brought into cooperative alignment with the notch 48 as the cam 46 is rotated. As there is only one notch 48 on the cam only one valve member can be open at any one time and that valve member is the one which is in alignment with the notch as the cam is selectively moved into position for such cooperative engagement between the notch and detent. All of the other valve members are maintained in closed position by reason of their respective detents being in engagement with the peripheral wall of the cam.

It may be desirable to have a neutral position for the cam, and for this reason the greater spacing between the adjacent inlet openings 22 and 26 is provided, whereby the cam may be moved to bring the notch to a position therebetween without operation of any of the valve members.

Another important feature of this invention is that while there are five fuel inlet openings employed in the present structure, the casing may be constructed with any required number of such openings, dependent upon the characteristics of the aircraft upon which the control valve mechanism is to be mounted.

To those skilled in the art it will be sufficient to say that the control valve is connected at any desirable location on the aircraft or other supporting structure. It is customarily located remotely from the cockpit in which the pilot sits and the actuating means is generally mounted upon the instrument panel in a position convenient to the pilot. A flexible cable or other connecting means may have one end connected to an operating lever or other means and its opposite end securely connected to the free end of the shaft 55 of the fuel control valve assembly. The screw-threaded fuel inlet openings in the tubular extensions 22 to 26, inclusive, are each connected by a suitable conduit (not shown) to different fuel tanks located at various positions on the aircraft. The screw-threaded fuel outlet opening 15 is connected by a suitable conduit (not shown) with a fuel pump or other engine fuel supply means as the case may be, and the function of the valve is to cut out from one tank as it is emptied and to cut into another tank which is full of fuel, with the least possible effort and attention being required on the part of the operator.

In the present case the operator or pilot turns the actuating handle on the instrument panel and this causes the shaft 55 to be rotated about its axis, which in turn moves the cam 46 with its notch 48 to a position adjacent a different valve member. When the notch 48 is adjacent the proper detent 36 the latter is moved into the notch by the action of the spring 49 on the pin 39 which in turn moves the valve head 31 out of engagement with its valve seat and thus establishes communication between the inlet opening and the outlet opening through the passageways 17. As there is only one notch in the cam the pilot or operator can tell by the sense of feeling when the notch on the cam has been moved from one valve member to another. This physical sensation is so definite that it is unnecessary for the pilot to watch a dial or other designating device. It should be further observed that as the cam is rotated the detent in cooperative engagement with the slot is moved outwardly by the cam action between one of the rounded corners 54 in the adjacent face of the detent, the relationship being such as to require a minimum amount of torque on the part of the operator in rotating the cam. This movement causes the valve member to move outwardly, thus effecting a closing of the fuel inlet opening and the valve member remains closed by reason of continual engagement between its detent and the peripheral wall of the cam.

It will be understood that details of construction may be varied through a wide range without departing from the principles of the present invention and it is not, therefore, our purpose to limit the present invention otherwise than by the scope of the appended claims.

We claim as our invention:

1. A fuel control valve comprising a housing defining a chamber having a plurality of non-communicating fuel openings provided with seats and communicating with said chamber; and means for selectively establishing communication between any one of the fuel openings and the chamber, comprising a plurality of valve members disposed in said housing in spoke-like array and having valve heads at their outer ends cooperatively engageable with the seats of said fuel openings for controlling the flow of fuel thereby, said valve members being further provided with stems inwardly of said heads suitably mounted for individual sliding movement, each of said stems being sectional and including telescopically arranged portions; a spring disposed in each of said telescopically arranged stem portions and having its opposite ends engageable with different stem portions to exert a separating force therebetween considerably greater than the static head of fuel in the opening associated with said seat; whereby the valve heads are maintained in closed position despite the static head, one of said stem portions having a slot extending transversely therethrough, a pin extending loosely through said slot and having its opposite ends projecting through aligned openings in the other stem portions for limiting the relative sliding movement of said stem portion but permitting both angular and axial adjustments of said head relative to said stem portion to facilitate seating of said heads on said seats, and an operating shaft rotatably mounted in said housing and having a cylindrical cam portion the peripheral wall of which is continuously engageable with said stems for normally maintaining said valve heads in closed position, the peripheral wall of said cam portion being provided with a single notch in cooperative alignment with said stems and permitting opening movement of said valve heads individually and selectively.

2. A fuel control valve comprising a housing defining a chamber having a plurality of non-communicating fuel inlet openings provided with seats and a fuel outlet opening communicating with said chamber, and means for selectively establishing communication between any one of the fuel inlet openings and the chamber comprising a plurality of valve members disposed in said housing in generally spoke-like array and having enlarged head portions at their outer ends cooperatively engageable with the seats of said fuel inlet openings for controlling the flow of fuel thereby, said valve members being further provided with stems suitably mounted for individual sliding movement, each of said stems being sectional and including telescopically arranged portions, a spring disposed in each of said telescopically arranged stem portions and having its opposite ends engageable with different stem portions to exert a separating force therebetween considerably greater than the static head of fuel in the inlet opening associated with said seat, whereby the valve heads are maintained in closed position despite the static head; one of said stem portions having a slot extending transversely therethrough, a pin extending through said slot and having its opposite ends projecting through aligned openings in the other stem portion for limiting the relative sliding movement of said stem portions, a spring disposed in said chamber and having a portion forcibly engageable with said pin to urge the valve member in the direction of its opening movement, and an operating shaft rotatably mounted in said housing and having a cylindrical cam portion the peripheral wall of which is continuously engageable with said stems for normally maintaining the said valve heads in closed position, the peripheral wall of said cam portion being provided with a single notch in cooperative alignment with said stems and permitting opening movement of said valve heads individually and selectively.

3. A fuel valve comprising a housing defining a chamber having a plurality of non-communicating fuel inlet openings provided with seats and a fuel outlet opening communicating with said chamber and means for selectively establishing communication between any one of the fuel inlet openings and the chamber, comprising a plurality of valve members disposed in said housing in spoke-like array and having valve heads at their outer ends cooperable with the seats of said fuel inlet openings for controlling the flow of the fuel therepast, said valve members being further provided with inwardly extending stems suitably mounted for independent sliding movement, each of said stems being sectional and including telescopically arranged portions, a spring disposed in each of said telescopically arranged stem portions and having its opposite ends engageable with different stem portions to exert a separating force therebetween sufficient to maintain a yieldable seal between the cooperating valve head and seat in excess of the static head of fuel in the inlet opening associated with said seat, means for limiting the relative sliding movement of said stem portions, and a cam member rotatably mounted in the center of said housing and having a portion continuously engageable with said stems for normally maintaining said valve heads in closed position, said portion being provided with means in cooperative alignment with said stems and adapted to permit opening movement of said valve members individually and selectively, and resilient means for urging each of said valve members inwardly against said cam member, said resilient means being disposed within said chamber and respectively engaging said valve members inwardly of said heads, whereby unimpeded fluid flow may occur through any selected inlet opening into said chamber.

4. A selector valve comprising a body having a generally circular fluid chamber with a plurality of radially spaced passageways leading away therefrom, a plurality of valve seats defined by the body and located at the mouth of each of said passageways, a plurality of valve heads in the fluid chamber operating to and from the seats, a sectionalized telescopic valve stem for each valve, each of said stems including an axial stub extension projecting away from the valve head into the fluid chamber and being slidably mounted in an axial tubular extension, one end of each tubular extension being closed and defining a detent surface, an annular guide member in the center of the fluid chamber defining a plurality of radially spaced openings to slidably receive the tubular extensions, a coil spring disposed axially in each tubular extension normally tending to separate the extension elements of the sectionalized stems, separate means for each valve to limit the relative telescopic movement between said extension elements, a rotatable cam in the center of the guide member and having a notched cam surface cooperable with the detent surface of the tubular extensions to selectively seat each valve head on a corresponding valve seat, and a plurality of spring means between the sectionalized stems and the body to assist in opening each valve when the detent surface of the tubular extension registers with a notch in the cam member.

5. A selector valve comprising a body having a generally circular fluid chamber with a plurality of radially spaced passageways leading away therefrom, a plurality of valve seats defined by the body and located at the mouth of each of said passageways, a plurality of valve heads in the fluid chamber operating to and from the seats, a sectionalized telescopic valve stem for each valve, each of said stems including an axial stub extension projecting away from the valve head into the fluid chamber and being slidably mounted in an axial tubular extension, one end of each tubular extension being closed and defining a detent surface, an annular guide member in the center of the fluid chamber defining a plurality of radially spaced openings to slidably receive the tubular extensions, a coil spring disposed axially in each tubular extension normally tending to separate the extension elements of the sectionalized stems, separate means for each valve to limit the relative telescopic movement between said extension elements, a rotatable cam in the center of the guide member and having a notched cam surface cooperable with the detent surface of the tubular extensions to selectively seat each valve head on a corresponding valve seat, and a plurality of spring means between the sectionalized stems and the body to assist in opening each valve when the detent surface of the tubular extension registers with a notch in the cam member, said spring means each comprising a shaped spring having relatively spaced coil portions with the free ends engageable with the valve body and an intermediate portion defining a connecting loop to encircle the tubular extension portion of each corresponding stem.

6. A selector valve comprising a body having a generally circular fluid chamber with a plurality of radially spaced passageways leading away therefrom, a plurality of valve seats defined by the body and located at the mouth of each of said passageways, a plurality of valve heads in the fluid chamber operating to and from the seats, a sectionalized telescopic valve stem for each valve, each of said stems including an axial stub extension projecting away from the valve head into the fluid chamber and being slidably mounted in an axial tubular extension, one end of each tubular extension being closed and defining a detent surface, an annular guide member in the center of the fluid chamber defining a plurality of radially spaced openings to slidably receive the tubular extensions, a coil spring disposed axially in each tubular extension normally tending to separate the extension elements of the sectionalized stems, separate means for each valve to limit the relative telescopic movement between said extension elements, a rotatable cam in the center of the guide member and having a notched cam surface cooperable with the detent surface of the tubular extensions to selectively seat each valve head on a corresponding valve seat, and a plurality of spring means between the sectionalized stems and the body to assist in opening each valve when the detent surface of the tubular extension registers with a notch in the cam member, the axial stub extension of each valve stem having a transversely disposed slot-like passage and the means to limit relative telescopic movement comprising a pin means to project through said passage with clearance on either side thereof.

ERNEST IRTI.
ARTHUR A. O'SICKEY.

REFERENCES CITED

The following references are of record in the file of this patent:

UNITED STATES PATENTS

| Number | Name | Date |
| --- | --- | --- |
| 845,458 | Gilbert | Feb. 26, 1907 |
| 1,925,610 | Shinn | Jan. 14, 1930 |
| 2,219,982 | Downey | Oct. 29, 1940 |
| 2,311,110 | Johnson | Dec. 9, 1940 |
| 2,420,589 | Dunnihoo | May 13, 1947 |
| 2,441,253 | Sarver | May 11, 1948 |

FOREIGN PATENTS

| Number | Country | Date |
| --- | --- | --- |
| 534,978 | Germany | Oct. 6, 1931 |
| 611,167 | France | June 28, 1926 |